(12) United States Patent
Liu et al.

(10) Patent No.: US 6,923,404 B1
(45) Date of Patent: Aug. 2, 2005

(54) APPARATUS AND METHODS FOR VARIABLE SWEEP BODY CONFORMAL WING WITH APPLICATION TO PROJECTILES, MISSILES, AND UNMANNED AIR VEHICLES

(75) Inventors: Danny D. Liu, Scottsdale, AZ (US); Ping-Chih Chen, Scottsdale, AZ (US); Darius Sarhaddi, Mesa, AZ (US)

(73) Assignee: ZONA Technology, Inc., Scottsdale, AZ (US)

( * ) Notice: Subject to any disclaimer, the term of this patent is extended or adjusted under 35 U.S.C. 154(b) by 20 days.

(21) Appl. No.: 10/339,908

(22) Filed: Jan. 10, 2003

(51) Int. Cl.[7] .......................... B64C 30/00; B64C 9/00; B64C 1/00
(52) U.S. Cl. ...................................................... 244/46
(58) Field of Search .................. 244/46, 7 R, 7 A, 244/8, 14, 16, 45 R, 123, 124, 3.1, 3.24, 3.13, 3.26; 124/70–77; 102/382, 384, 385, 501, 503

(56) References Cited

U.S. PATENT DOCUMENTS

| | | | | |
|---|---|---|---|---|
| 3,155,344 A | * | 11/1964 | Vogt | 244/46 |
| 3,606,571 A | * | 9/1971 | Wood | 416/87 |
| 3,693,910 A | * | 9/1972 | Aldi | 244/7 A |
| 3,971,535 A | * | 7/1976 | Jones | 244/46 |
| 4,120,468 A | * | 10/1978 | Fischer | 244/13 |
| 4,842,218 A | * | 6/1989 | Groutage et al. | 244/3.28 |
| 4,913,378 A | * | 4/1990 | Calvert | 244/46 |
| 4,998,689 A | * | 3/1991 | Woodcock | 244/46 |
| 5,078,339 A | * | 1/1992 | Lapidot | 244/49 |
| 5,454,530 A | * | 10/1995 | Rutherford et al. | 244/7 A |
| 5,615,847 A | * | 4/1997 | Bourlett | 244/63 |
| 5,992,796 A | * | 11/1999 | Smith | 244/45 A |
| 6,082,671 A | * | 7/2000 | Michelson | 244/72 |
| 6,161,799 A | * | 12/2000 | Nyhus | 244/7 A |
| 6,170,779 B1 | * | 1/2001 | Nyhus | 244/7 A |
| 6,471,158 B1 | * | 10/2002 | Davis | 244/8 |
| 6,601,795 B1 | * | 8/2003 | Chen | 244/46 |

OTHER PUBLICATIONS

"The minimum drag of thin wings in frictionless flow", Journal of the Aeronautical Sciences, vol. 18, No. 2, 1951 pp. 75–81.
"Aerodynamic design for supersonic speed", Advance in Aeronautical Sciences, vol. 1, Pergammon Press, 1959.
"Transonic Transport wing: Oblique or swept?", Astronautics and Aeronautics, Jan. 1974, co–authored with J. Nisbet of Boeing.
"The oblique wing: aircraft design for transonic and low supersonic speeds", Acta Aeronautica, vol. 4, Pergammon Press, 1977.

(Continued)

Primary Examiner—Michael J. Carone
Assistant Examiner—Stephen Holzen

(57) ABSTRACT

An unmanned air vehicle ("UAV") apparatus is configured to have a body and a body-conformal wing. The body-conformal wing is configured to variably sweep from a closed position to a fully deployed position. In the closed position, the body-conformal wing span is aligned with the body axis and in the fully deployed position the body-conformal wing span is perpendicular to the axial direction of the body. Delivery of the UAV comprises the steps of: positioning the span of a body conformal wing in alignment with the axis of the body of the UAV; initiating the flight of the UAV; and adjusting the sweep angle of the body-conformal wing as a function of the current speed, altitude, or attack angle of the UAV, with the adjustment starting at a 0 degree position and varying between a closed position and a fully deployed position. The UAV also has a control mechanism configured to variably adjust the sweep of the body-conformal wing to achieve a high lift over drag ratio through out the flight path of the UAV.

29 Claims, 12 Drawing Sheets

OTHER PUBLICATIONS

"Manual aerodynamic optimization of an oblique wing supersonic transport" by Li, Sobieczky and Seebass, J. of Aircraft, vol. 36, No. 6, Nov.–Dec. 1999, pp. 907–913.

"Oblique wing transonic transport configuration development", NASA CR–151928, 1977.

"Flight characteristics of the AD–1 oblique–wing research aircraft", by Sim and Curry, NASA technical paper 2223, Mar. 1985.

Inflatable Wings: Gun Launched Observation Vehicle, http://www.vertigo-inc.com/Aeronautical_Systems/GLOV/GLOV.html, Jan. 8, 2003.

Wide Area Surveillance Projectile, http://web.mit.edu/aeroastro/www/labs/ICE/projects/wasp.html, Jan. 8, 2003.

NASA Facts, http://www.dfrc.nasa.gov/PAO/PAIS/HTML/FS–019–DFRC.html, Nov. 8, 2002.

AD–1 Oblique Wing Photo Gallery Contact Sheet, http://www.dfrc.nasa.gov/gallery/photo/AD–1/HTML/index.html, Nov. 8, 2002.

AD–1 Oblique Wing Images, http://www.dfrc.nasa.gov/gallery/photo/AD–1/index.html, Nov. 8, 2002.

http://www.dfrc.nasa.gove/gallery/photo/AD–1/Medium/ECN–13302B.jpg, Nov. 8, 2002.

http://www.dfrc.nasa.gov/gallery/photo/AD–1/Medium/ECN–15846.jpg, Nov. 8, 2002.

http://www.dfrc.nasa.gov/gallery/photo/AD–1/Medium/ECN–13305.jpg, Nov. 8, 2002.

http://www.dfrc.nasa.gov/gallery/photo/AD–1/Medium/EC81–14632.jpg, Nov. 8, 2002.

http://www.dfrc.nasa.gov/gallery/photo/AD–1/Medium/EC80–12694.jpg, Nov. 8, 2002.

Nigel Macknight, *Tomahawk Cruise Missile*, Motorbooks International Publishers: Mil–Tech Series, 1995.

* cited by examiner

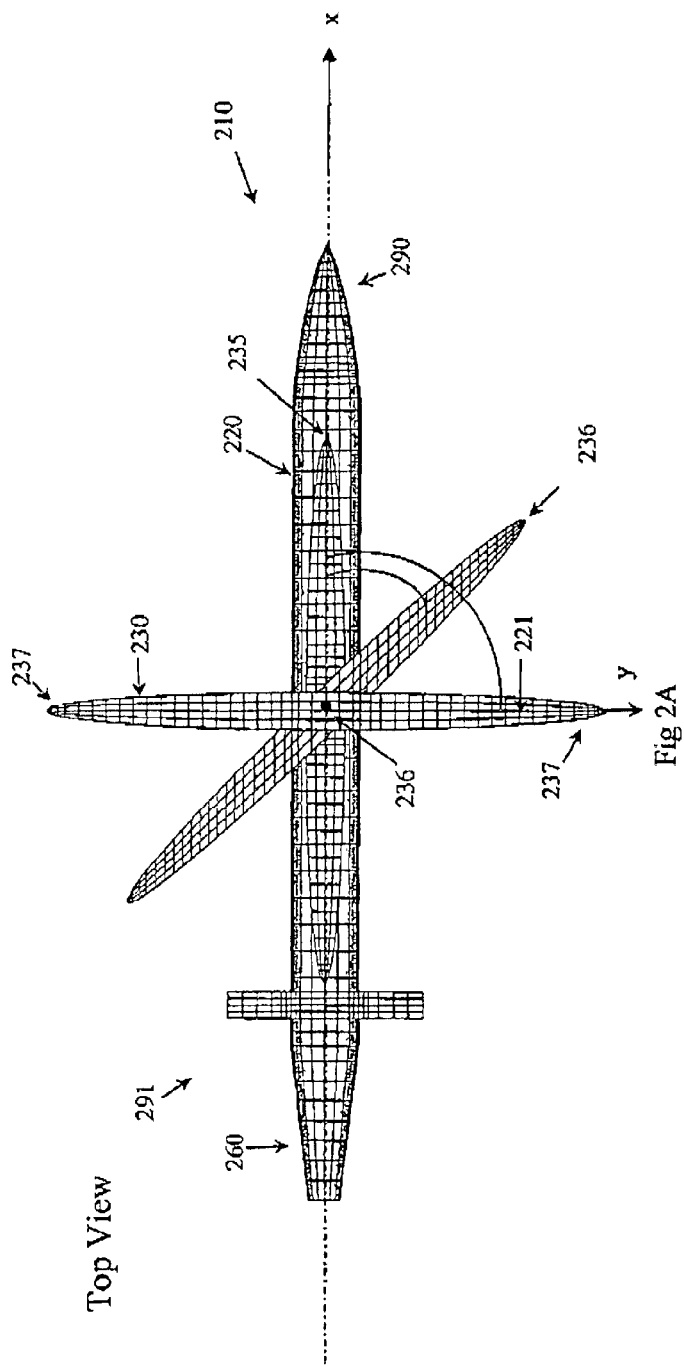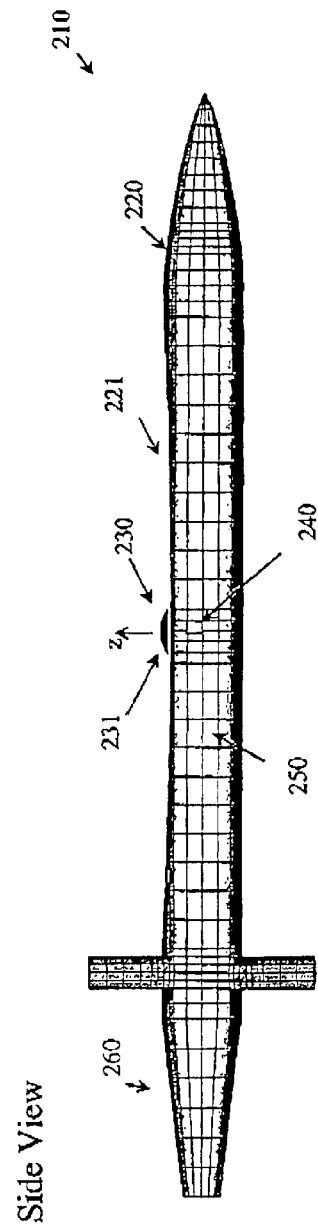
Top View  Fig 2A
Side View  Fig 2B

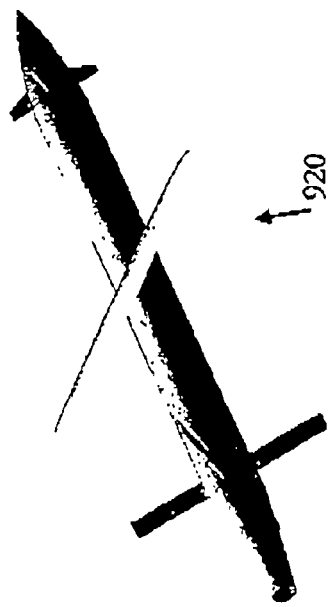
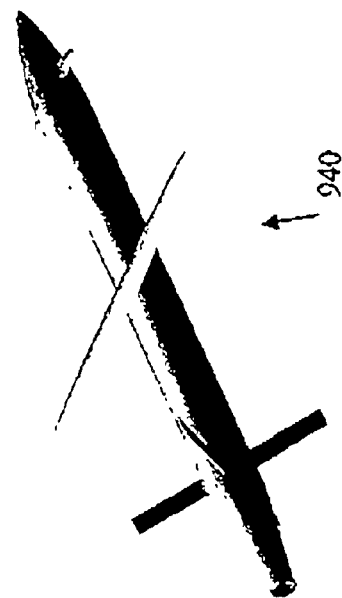
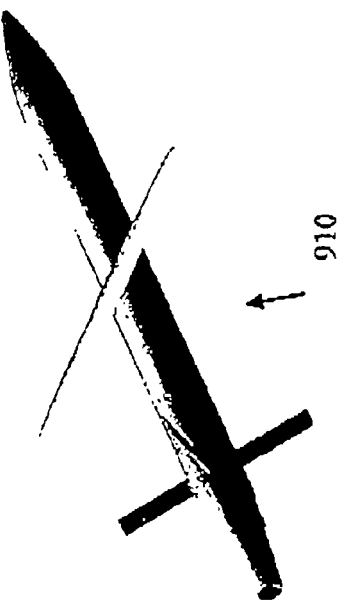
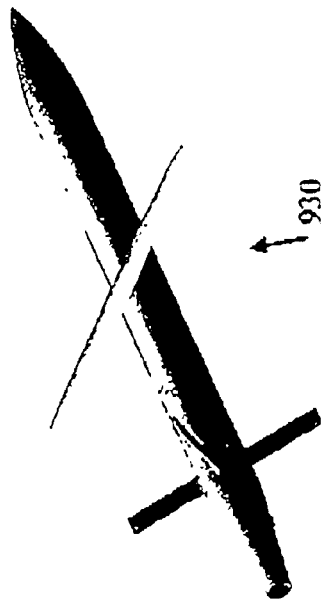
Fig. 9

APPARATUS AND METHODS FOR VARIABLE SWEEP BODY CONFORMAL WING WITH APPLICATION TO PROJECTILES, MISSILES, AND UNMANNED AIR VEHICLES

STATEMENT OF GOVERNMENT INVOLVEMENT

This application involves an invention made with United States Government support under SBIR PhaseII entitled "Gun-Launched Projectile/Arizona Glider (AG) Design Concept as an ERGM and Reuseable Launch Munition (RLM) Vehicle," Contract No. N00178-02-C-1007) awarded by the Navy/NSFS (Naval Surface Warfare Center, Dahlgren Division, Dahlgren, Va. 22448). The Government has certain rights in the invention as described in FAR 52227-11 Patent Rights—Retention by the Contractor (Short Form) June 1997.

FIELD OF THE INVENTION

The present invention relates to an unmanned vehicle configured to fly through the air. More particularly, the present invention relates to an apparatus, systems and methods for aerial delivery of an unmanned vehicle having a variable sweep, body-conformal, wing, where the unmanned vehicle is a rocket, projectile, rocket-assist projectile, or other unmanned air delivered or ground launched vehicle.

BACKGROUND OF THE INVENTION

As used herein, the term "unmanned air vehicle" ("UAV") refers to any unmanned object that can be gun launched, rocket launched, dropped from a vehicle that is already aloft, or otherwise made to fly through the air over great distances, such as rockets, missiles, projectiles, or any other like un-manned devices. A UAV may or may not include internal propulsion mechanisms. Thus, a UAV may include any un-manned object that can be made to fly through the air.

In general, it is desirable to increase the distance over which a UAV can be delivered and to decrease its delivery time. Unfortunately, UAV range and time for delivery have been limited by, among other things, low aerodynamic efficiency. Low aerodynamic efficiency may be characterized, for example, by a low Lift/Drag ("L/D")) ratio and/or by the low aerodynamic drag of the UAV. It is also desirable to also increase the size and/or weight of the payload of the UAV. The payload is defined herein to be any material, ordinance, equipment or the like that is contained within or transported by the UAV. As further described below, UAV payload size has also been limited due to the bulk of the devices used to aid in the long range delivery of the UAVs.

An ongoing effort exists to develop a new apparatus and methods for extending the range of ordinance and other UAVs. For example, several attempts have been made to extend the range of projectiles, rockets, and the like regardless of the firing or launching device. In one example, such attempts involve projectiles that can be fired from guns. For example, the Forward Air Support Munition (FASM) concept involves a gun launched projectile that eventually deploys a parachute in order to deploy inflatable fixed wings, and then starts a diesel engine to cruise under remote control. The Gun Launched Observation Vehicle (GLOV) is launched from a Naval ship gun; GLOV also deploys an inflatable wing. The Wide Area Surveillance Projectile (WASP) is another gun launched projectile using a parachute for deceleration. After the WASP deploys its parachute, it unfolds a wing from the body and activates a propeller for cruising reconnaissance. Others, such as the EX-171 Extended Range Guided Munition (ERGM) are initially fired from a gun, but also include a rocket for additional range assistance. The Chance Vaught BGM-110 is a cruise missile with a rocket propulsion device and a deployable wing. The deployable wing is contained within the rocket body.

These approaches may have several drawbacks. For example, inclusion of a propulsion device (rocket, propeller, or the like) and the fuel to drive the propulsion device decreases the size and weight of the payload that can be carried by the UAV (assuming constant weight and size constraints). Similarly, the un-deployed wings occupy space within the body of the UAV that could otherwise be used for payload.

Furthermore, each of these devices exhibit various degrees of low aerodynamic efficiency, thus limiting the range of delivery of the payload or the range for a surveillance mission or the like. Moreover, no UAVs have been designed that can be configured to achieve high aerodynamic efficiency at all speeds (including supersonic, transonic, and subsonic) and/or at all altitudes. Previous UAV designs are so limited, for example, because the wings are fixed in a single deployed position. In a further example, on the Tomahawk Missile, the wings just pop out from the body mid-section to a full open position. Thus, no UAV's have any mechanisms for increasing range and/or reducing flight times by achieving high aerodynamic efficiency at all speeds. In addition, UAV designs that use a parachute are limited because the wings generally are only deployed once the UAV reaches relatively slower speeds. Thus, UAVs employing parachutes must lose much of their initial inertia as well as valuable time during deployment of the wing.

SUMMARY OF THE INVENTION

The methods and apparatus according to the present invention addresses many of the shortcomings of the prior art. In accordance with one aspect of the present invention, a UAV apparatus is configured for delivery of a payload, with the UAV having a body, a body-conformal wing, and a control mechanism. The body-conformal wing is configured to variably sweep as a function of the speed, altitude, and/or flight path of the UAV. The body-conformal wing may be configured to form a portion of the outer surface of the UAV when in a closed position. Thus, the UAV may, for example, comprise a seamless outer mold line for the non-deployed configuration. The body-conformal wing may be configured, in the closed position, with the span of the body-conformal wing aligned with the body axis. The body-conformal wing is deployed by rotating the wing about a pivot point. The wing may be rotated to any sweep angle from 0 through 360 degrees. The control mechanism is configured to variably adjust the sweep angle of the wing in order to achieve high aerodynamic efficiency and/or improved aerodynamic performance.

Furthermore, methods for delivering a UAV having a body and a body conformal wing are provided. For example, the method may comprise the steps of positioning the body conformal wing on the UAV with the length of the body conformal wing aligned with the axial length of the body of the UAV; initiating the UAV flight; and adjusting the sweep angle of the body conformal wing as a function of the current speed (or other factor) of the UAV.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

FIGS. 2A–2B illustrate top and side views, respectively, of an exemplary variable sweep wing UAV in accordance with an exemplary embodiment of the present invention;

FIG. 9 illustrates four exemplary combinations of control-dominated designs in various exemplary variable sweep wing UAV's in accordance with an exemplary embodiment of the present invention.

DETAILED DESCRIPTION OF EXEMPLARY EMBODIMENTS

The present invention may be described herein in terms of various functional components and various method steps. It should be appreciated that such functional components may be realized by any number of structural components, hardware, or software configured to perform the specified functions. For example, the present invention may employ various electronic components and integrated circuits, which are suitably configured for various intended purposes; such as flight control systems.

As used herein, the term UAV refers to any unmanned object that can be gun launched, rocket launched, dropped from a vehicle that is already aloft, or otherwise made to fly through the air over great distances, such as rockets, missiles, projectiles, or any other like un-manned devices. Various aspects of the present invention may be practiced on various types of UAV's regardless of the method of initiating the flight of that UAV or the platform used to initiate that flight. As will be further described herein, these UAVs may or may not include internal propulsion mechanisms. For purposes of illustration only, exemplary embodiments of the present invention are described herein in connection with a gun launched projectile having a body-conformal variable sweep wing. However, the application of a variable sweep wing to UAVs is not so limited. UAV's may encompass air-to air, air to surface, surface to air, or surface to ground UAVs.

UAV

That being said, in accordance with an exemplary embodiment of the present invention, an exemplary UAV comprises a body, a body conformal wing, and a control mechanism. The body conformal wing is moveably connected to the body portion. The wing is configured to variably sweep, as driven by the control mechanism, from a closed position to a deployed position, as a function of, for example, the speed and/or altitude of the UAV. In the closed position, the wing span is aligned with the longitudinal axis of the body or the body axis, and in the deployed position the wing span is positioned at an angle to the longitudinal axis of the body or body axis as great as perpendicular to the axial length of the body. By use of the word aligned, it is intended that the wing span is substantially aligned with the body axis.

Figure 1:
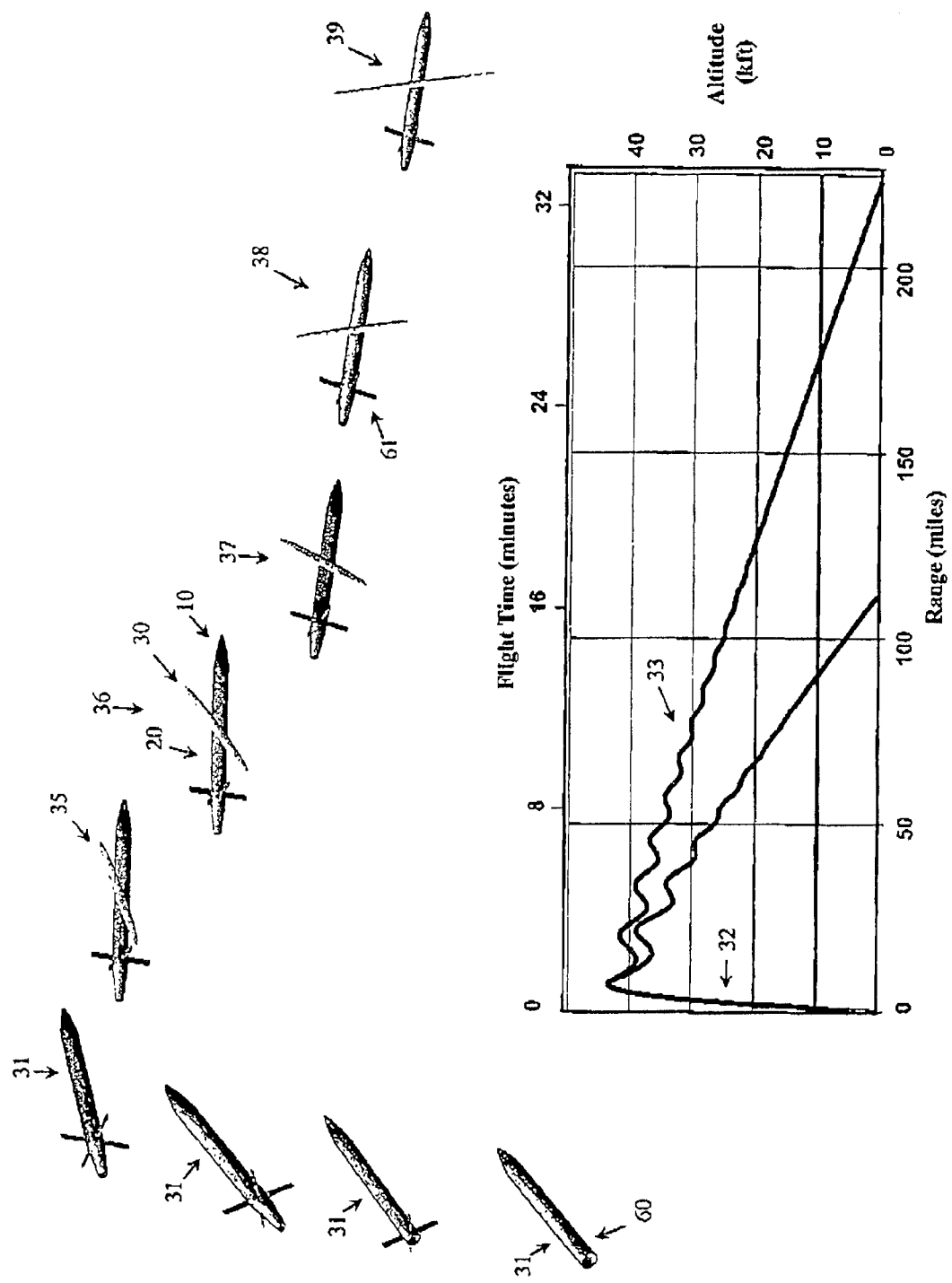
FIG. 1 illustrates various flying modes of an exemplary variable sweep wing UAV.

FIG. 1 illustrates an exemplary UAV 10 at various stages in its flight path, in accordance with an exemplary embodiment of the present invention. In this exemplary embodiment, UAV 10 comprises a body 20, a body conformal wing 30, and a control mechanism (not shown). Body conformal wing 30 is illustrated in a closed position 31 during a ballistic phase 32 of the flight of UAV 10.

As stated above, UAV 10 is configured with the wing that is deployable during the flight of UAV 10. Thus, wing 30 has a variable sweep configuration, i.e., wing 30 can be deployed at various oblique angles—sweep angles (see reference numbers 35–37). Therefore, the wing may be variably positioned from a closed position 31 to an oblique position (35 and 36) to a fully deployed position (e.g., 37). The sweep-angle is selected for high aerodynamic efficiency, i.e., a high Lift/Drag (L/D) ratio, for UAV 10. The use of a variable oblique wing, with an appropriate sweep angle, in conjunction with UAV 10 may result in a high and/or optimal lift/drag ratio throughout the flight regime over supersonic, transonic and subsonic speeds. The high L/D ratio is achieved, for example, by use of an aerodynamic optimization scheme.

In accordance with various aspects of the present invention, L/D ratios may be obtained ranging from, for example, 3.5 to 12. Such L/D ratios may be substantially higher than L/D ratios for non-sweep wing UAVs under similar flight conditions. Increasing aerodynamic efficiency has the effect of increasing the distance the UAV can fly. Thus, the range of the UAV may be extended via aerodynamically efficient gliding. In addition, because the speed and altitude of the UAV are constantly changing, sweep angle of the variable oblique wing is selected for efficient gliding at the current speed or altitude of UAV 10.

Body Portion

FIGS. 2A and 2B illustrate another exemplary UAV 210 comprising a body 220, a body-conformal wing 230, and a control mechanism 240. In general, body 220 is configured as an outer protective casing for UAV 210 as well as to provide an aerodynamic outer surface. As a gun launched UAV, body portion 220 may generally be configured to take on the outer dimensions and casing characteristics of standard gun launched barrage rounds or the like. In this exemplary embodiment, body portion 220 is configured with suitable materials and construction techniques to sustain the approximately 12,000–16,000 G's of acceleration force to which UAV 210 may be subject during a launch. Any appropriate gun-hardening composite/metallic designs may be used in conjunction with the present invention. Also, when launched from a gun, an exemplary UAV may be configured to have approximately the same weight and outer shape of standard gun launched Barrage Rounds. Furthermore, in one exemplary embodiment of the present invention, the diameter of the body may be no greater than approximately five inches so as to be accommodated within an approximately 5 inch (inside diameter) gun (e.g., standard Navy Destroyer guns).

Nevertheless, the variable sweep wing described herein may also be used with projectiles or barrage rounds of various diameters, lengths and weights as appropriate for the various guns used to launch these UAVs. Furthermore, in various embodiments, the UAV outer surface may have a non-circular perimeter. For example, the outer surface perimeter may be oval, triangular, or any other suitable shape. It is noted that in the context of a rocket or air dropped UAV, the gun hardening and size constraints may not be applicable. Body 220 may be configured to be of any length and diameter that provides a suitable slender ratio such that UAV 210 has high L/D ratios. Body portion 220 may further be extendable in length by inflation of a tapered tail portion 260 during flight. In one exemplary embodiment of the present invention, body 220 is approximately 71.6 inches long with the deployment of an inflatable tail. Other suitable body lengths may be used as appropriate for selected UAV devices.

Body portion 220 may be configured to have a recessed portion 221 for containing body conformal wing 230 when in a closed position. In other exemplary embodiments, recess 221 may be reduced or eliminated when body 220 is configured to contain only a portion of body conformal wing 230 or none of body conformal wing 230, such as in UAV's that are not fired from a gun.

Body portion 220 may further be configured to contain a payload 250. In the munitions context, payload 250 may comprise explosives and the like. However, payload 250 might also be configured to contain leaflets, electronics equipment for reconnaissance, weather instruments and/or other instruments for scientific experiments, or any other suitable cargo. Because wing 230 is a body conformal wing, the cargo space for payload 250 may tend to be greater than that previously available due to the absence of bulky wing storage.

Figure 3:
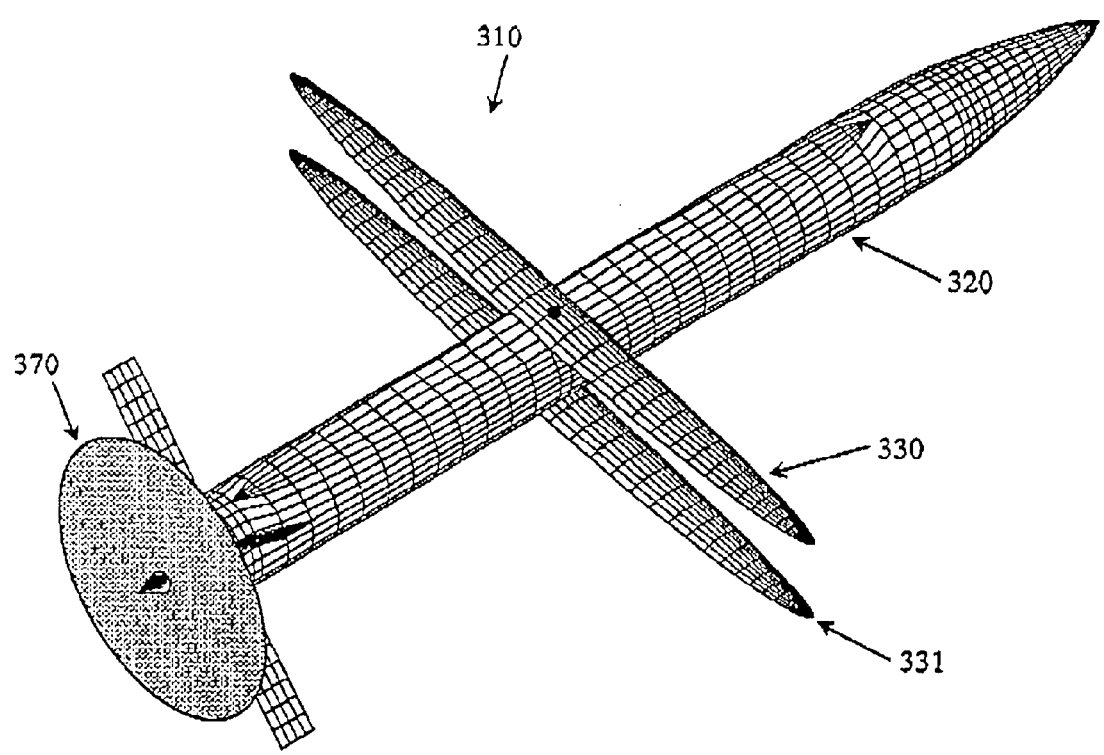
FIG. 3 illustrates the upper and lower wing position in a biplane UAV configuration for low subsonic cruise.

In accordance with another exemplary embodiment of the present invention, and with reference to FIG. 3, body 320 may be configured with a propulsion device 370. Although the propulsion device 370 illustrated in FIG. 3 is a propeller type device, propulsion device 370 may comprise other suitable propulsion mechanisms, such as a rocket, jet engine, or turbo type propulsion mechanism. A propeller may be driven by, for example, a combustion engine or electric motor. Inclusion of a propulsion device tends to increase range and decrease delivery time. However, including a propulsion device may negatively impact payload. Thus, in exemplary embodiments, an increase in payload volume is realized by elimination of a propulsion device from UAV 310.

Wing

In accordance with an exemplary embodiment of the present invention, wing 230 is configured to be a body conformal wing. The body conformal wing is seamlessly integrated mechanically with the body whereby the integrated outer mold-line matches that of a projectile without a wing. In this regard, the "match" is sufficiently similar to maintain (in the closed position) similar aerodynamic performance as that of a projectile without a wing. The body conformal wing plus projectile forms a unitary structure which, in one exemplary embodiment of the present invention, can survive gun launched accelerations of, for example, 12,000 g's. The body conformal wing is utilized in the gliding trajectory by a wing-swept scheduling to achieve high L/D throughout the flight for long range and/or short flight times.

With reference to FIGS. 2A–2B, body conformal wing 230 is received within a recess 221 of body 220 when in the closed or 0 degree position 235. The outer surface 231 of body conformal wing 230 forms a portion of the outer surface of body 220. Thus, UAV 210 is configured, for example, in a gun launched projectile embodiment, to conform to the inner diameter of a gun and to have a smooth aerodynamic outer surface that is composed partly of the body conformal wing 230. Although the outer mold line is sometimes described herein as "seamless", it is recognized that such seamless mold line is within standard tolerances applicable to the outer mold line of rockets, projectiles, and the like. Use of body conformal wing 230 may increase the available space within body 220 allowing an increased payload capacity. Use of body conformal wing 230 may further enhance six degree of freedom motion of the wing.

Figure 10:
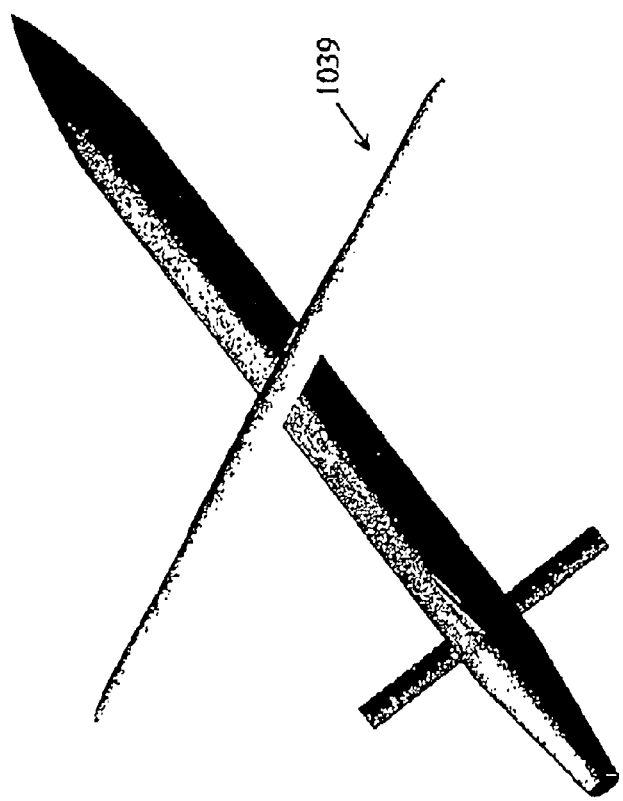
FIG. 10 illustrates an exemplary embodiment of an extendible wing on an exemplary UAV in accordance with an exemplary embodiment of the present invention.
Figure 11A:
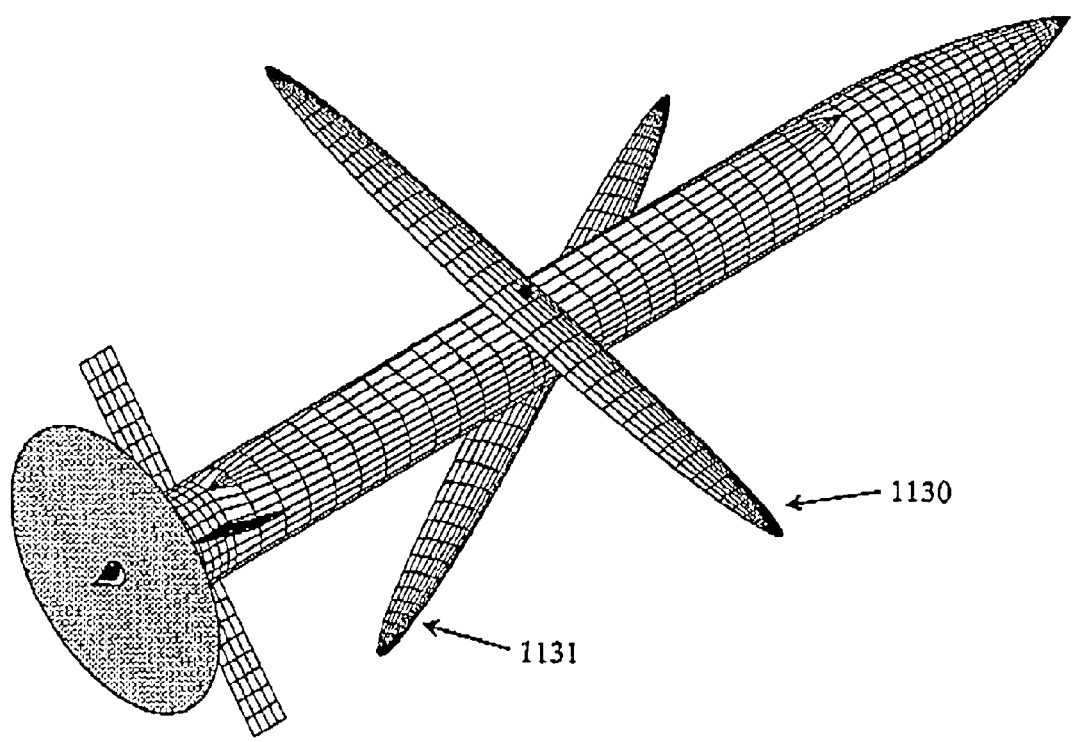
FIG. 11A illustrates the second wing swings out to render the UAV becoming a biplane configuration while the single wing is already in the fully extended position.
Figure 11B:
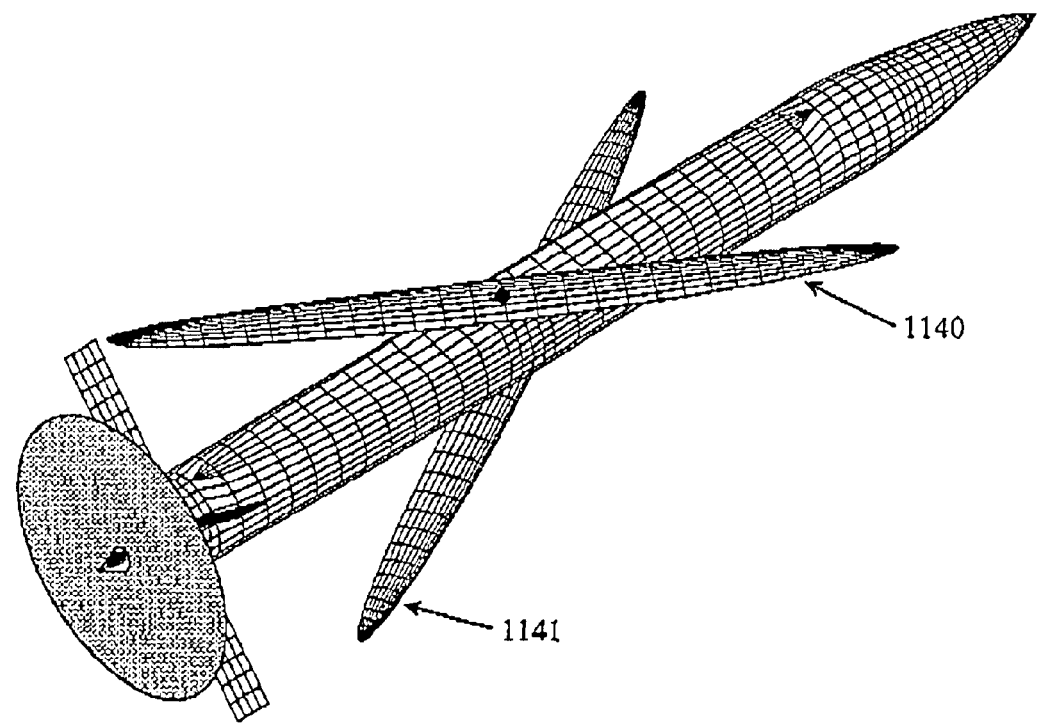
FIG. 11B illustrates both wings swing out symmetrically to form an X-configuration, which rapidly transitions to a final biplane UAV configuration.
Figure 12A:
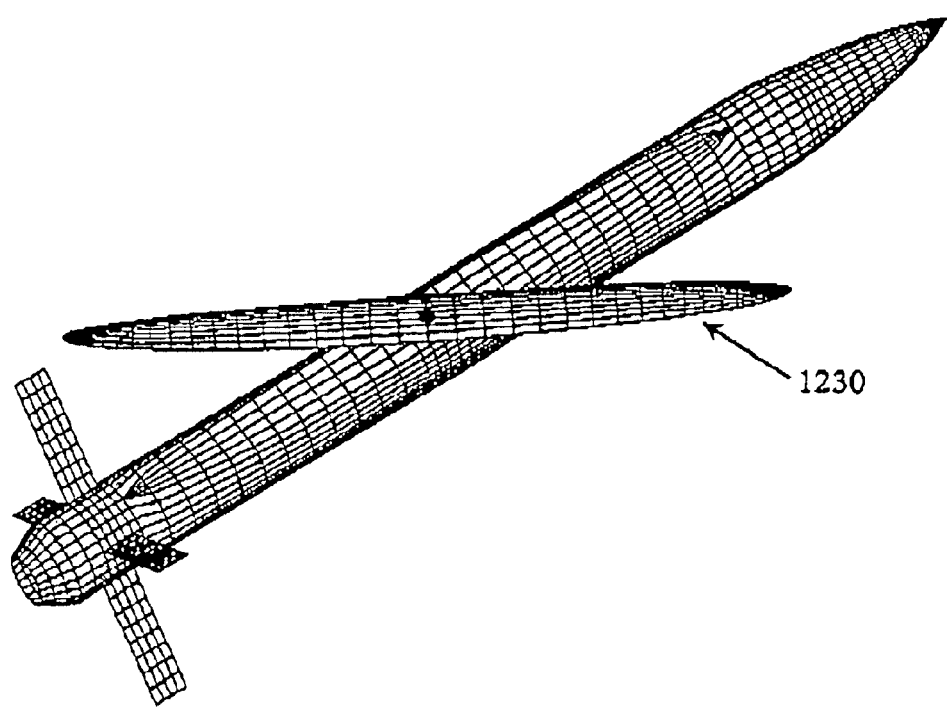
FIG. 12A illustrates the single wing in an oblique design position of the UAV for supersonic cruise.
Figure 12B:
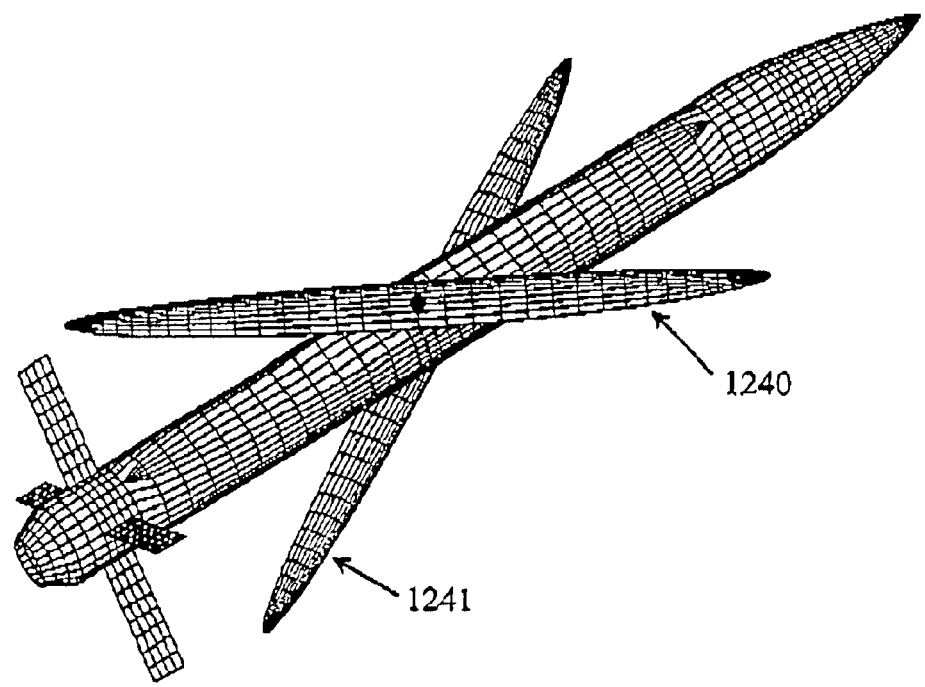
FIG. 12B illustrates the X-wing UAV configuration with both upper and lower wings in antisymmetric oblique design positions for supersonic cruise.

Wing 230 may have any suitable wing length. The wing length, in one exemplary embodiment, may be 40.7 inches from tip to tip, although other wing lengths may be used. Wing 230 may further be configured to be an extendable wing. An extendable wing may comprise a portion that is configured to telescope, and/or a portion configured to inflate to the extended length. See, e.g., FIG. 1, reference numbers 38 and 39 and FIG. 10, reference number 1039. In one exemplary embodiment an extended wing may have a tip-to-tip length of 67.7 inches, although other extended wing lengths are possible. Although wing 230 may be configured to have various widths and thicknesses, in one exemplary embodiment, wing 230 is approximately 2.85 inches wide and approximately 0.3 inches deep at its widest and thickest points.

Wing 230 may comprise a unitary wing structure that is configured to be moveably attached to body 220. The attachment mechanism is configured such that wing 230 can be rotated about a rotation point 236 on wing 230. Rotation point 236 may also be the attachment point on body 220. Wing 30 is configured to variably sweep from approximately 0 to 360 degrees. In accordance with various exemplary embodiments, wing 30 is configured to sweep less than 360 degrees. For example, wing 230 may be configured to sweep from a closed, 0 degree, position to a fully deployed (90 degree sweep angle) position.

Wing 230 may be configured to move fore and aft for pitch control. In this regard, wing 230 may be physically located on body 210 as appropriate for adjusting the aerodynamic center of gravity of UAV 310, e.g., towards a front end 290 or a back end 291. Furthermore, wing 230 may be configured to be movable (fore and aft) during flight. Therefore, moving wing 230 can change the aerodynamic center of gravity of the UAV providing enhanced pitch stability control and adjusting the UAV angle of attack. As further described below, aerodynamic efficiency can be improved in part by adjusting the UAV angle of attack.

Additionally, wing 230 may be configured with symmetric pitch or anti-symmetric pitch for roll and yaw control. In other words, wing 230 may be configured to tilt or rotate about a Y axis (see FIG. 2A). That said, wing 230 may be thus configured to be adjusted for enhancing yaw, pitch and roll control. In exemplary embodiments, these adjustments may be made during the flight of UAV 210. Wing 230 may be farther configured to have any suitable airfoil designs. In one example, wing 230 is configured with a flat bottom. Wing 230 may be designed by computational fluid dynamics (CFD), and Navier-Stokes methods for low transonic drag during the flight of the UAV.

In one example, a wing tip 237 may be configured as a "winglet", i.e., a control surface (with control mechanism). The winglet 237 control surfaces can perform stability control for roll and yaw. The pitch control in this exemplary embodiment is maintained by fore and aft movement of the entire wing. In other embodiments, wing control surfaces may include smart structures such as piezoelectric control (PZT), micro-electro-mechanical control (MEM), or synthetic jets; or may include conventional devices such as flaps with actuators. In one example, wing 230 may be a composite structure design with imbedded Piezoelectric (PZT) material for active and/or passive control enhancement. For example, composite wing designs may be subjected to aero-elastic tailoring to lessen the torsion stiffness for wing twisting. In a further example, the PZT material enhances the ability to exercise control force and control schedule.

With reference again to FIG. 3, and in yet another embodiment of the present invention, UAV 310 can be configured with two body conformal wings, 330 and 331. The first body conformal wing 330 is located on a top portion of body 320 and the second body conformal wing 331 is located on an opposite portion of body 320. For example, wings 330 and 331 may be configured to deploy to opposite sides, with one deploying from 0 to 90 degrees and the other deploying from 0 to –90 degrees. Thus, wings 330 and 331 may form an oblique X wing configuration during the wing deployment. Wings 330 and 331 may thus transition from X wing to a bi-plane configuration.

Tail Fins

In addition to the one or more variable sweep wings, UAV 210 may be configured to have tail fins, and/or canards. In the gun launched embodiment, the tail fins and/or canards are also configured to be deployed after firing from a gun. FIG. 1 illustrates exemplary tail fins 60 in closed position, contained within body 220 or similarly body conformal with body 220. Although various numbers of tail fins and/or canards may be used, in one embodiment, 4–8 fins may be used. FIG. 1 illustrates an exemplary four fin, tail fin 61 in deployed mode. FIG. 3 illustrates an exemplary V shaped tail fin 461 in deployed mode. Various other tail fin embodiments may be used. In accordance with exemplary embodiments of the present invention. The control of the flight path may occur via the use of fin, wing, and/or canard control of UAV 10. The control surfaces may include smart structures such as piezoelectric control (PZT), micro-electro-mechanical control (MEM), or synthetic jets; or may include conventional devices such as flaps with actuators.

Control Mechanism

With reference again to FIG. 2, an exemplary control mechanism 240 comprises any suitable mechanism configured to cause wing 230 to deploy and/or retract. For example, wing 230 may be deployed, retracted and/or adjusted (fore/aft or tilt/rotation about Y axis) by an electric motor, servo, spring unlock, and/or hydraulic piston. Control mechanism 240 is configured to maintain wing 230 in a "closed position" during a first portion of the flight (ballistic portion, FIG. 1, 32) and to open or deploy wing 230 during a second portion of the flight (glide portion, FIG. 1, 33). In addition, in one embodiment, control mechanism 240 is configured to deploy wing 230 in a monotonically increasing manner. However, control mechanism 240 may also be configured to retract wing 230 partially or fully. Control mechanism 240 may be configured with one or more computers and/or configured to receive instructions from on-board computers. Control mechanism 240 may further be configured to be controlled remotely.

Various sensors and devices may be included in UAV 210 such as air speed sensors, altitude sensors, attitude sensors, wing deployment sensors, timing devices, rocket burn status sensors, and/or the like. Signals from one or more of these devices and/or sensors may be interpreted and/or processed to determine an appropriate sweep angle for the present state of UAV 210. For example, an on board computer may receive information regarding the current speed, angle of attack, and altitude of UAV 210 and this information may be used to calculate (or look up in a table) an appropriate sweep angle for achieving a high aerodynamic efficiency. In other examples, the on board computer (with online/offline data) may calculate adjustments to the angle of attack and/or the speed as well as the sweep angle in order to achieve a high aerodynamic efficiency for extended range, etc. The angle of attack can be adjusted, for example, by moving/pitching wing 230 or using fin control. The speed can be adjusted, for example, by a propulsion device. Thus, a high aerodynamic efficiency may be achieved for UAV 210. The strategy for increasing trajectory range includes, but is not limited to, achieving a high Lift/Drag ratio. Such strategies can be provided by optimizing aerodynamic efficiency with UAV performance, thus yielding shorter delivery times and increased range for the UAV.

It should be noted that in various embodiments, some information can be determined without sensors. For example, the current altitude or speed may be determined by the time from launching UAV 210. Furthermore, tables for determining the sweep angle may factor in one or more of the following factors: speed, angle of attack, altitude, and the like.

Figure 8:
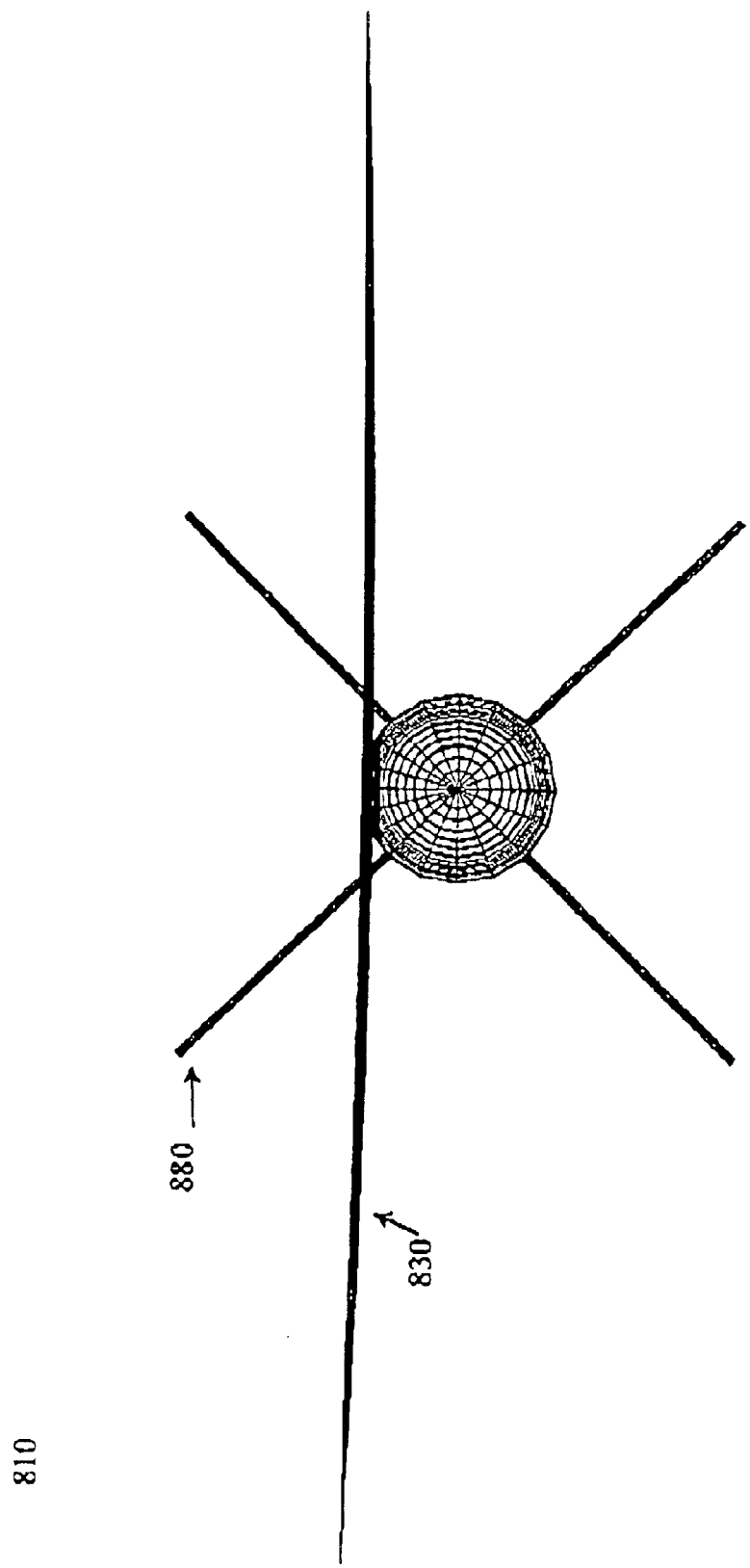
FIG. 8 illustrates a front view of an exemplary variable sweep wing UAV in accordance with an exemplary embodiment of the present invention.

UAV 210 may farther comprise sensors, electronics, and controls configured to guide and maneuver the UAV. The control of the flight path may occur via the use of fin, wing, and/or canard control of UAV 210. Also, in another embodiment, all or a portion of the surface of the fin or canard may be used to maneuver the UAV. With momentary reference to FIG. 8, various exemplary control dominated designs are illustrated. For example, control may be by fin control in UAV 910, canard control in UAV 920, wing control in UAV 930, or wing/canard control in UAV 940. Other combinations of control designs may also be employed. The control surfaces may use smart structures such as piezoelectric control (PZT), micro-electro-mechanical control (MEM), or synthetic jets; or conventional devices such as flaps with actuators. Rockets may additionally aid in the maneuvering of UAV 10.

Launch Structure

Figure 4:
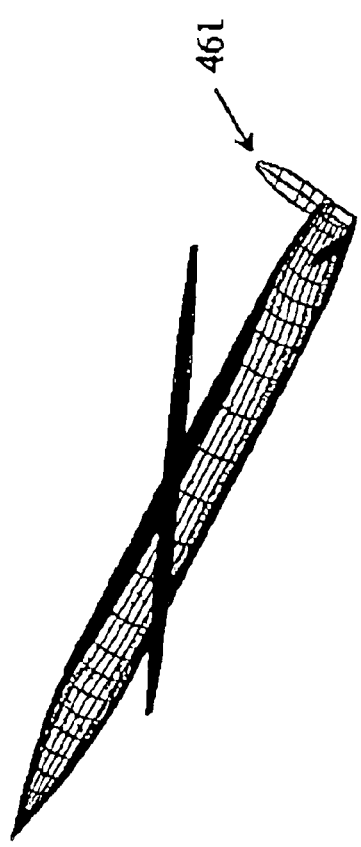
FIG. 4 illustrates a perspective view of an exemplary variable sweep wing UAV having a V tail in accordance with an exemplary embodiment of the present invention.

In accordance with an exemplary embodiment of the present invention, and with reference now to FIG. 4, UAV 510 is launched from a gun 550. Although various sizes of guns and projectiles may be employed in accordance with the present invention, in one example, gun 550 is a 5-inch (127 mm gun barrel diameter) Navy gun with a 64× diameter gun length (denoted by 127 mm/64) at 12,000 G's with a muzzle velocity of 2,700 ft/sec. Future Navy guns may be designed at from 127 mm/200, 155 mm/52, to 16 inches in diameter. The projectile may be designed to fit any of these, or other designs of guns. In another embodiment, the projectile may be fired from an electromagnetic rail gun, launched from a rocket launcher (on board, on ground, or in air), or have its flight otherwise initiated.

Method/function

Use of a variable sweep wing on a UAV that may travel at supersonic, transonic and subsonic speeds may extend the range of the UAV compared to the range of similarly configured UAVs without a variable sweep wing. Furthermore, such range extension may be achieved while also reducing the weight of the overall structure due to removal of propulsion devices. The practical result of this may be an ability to increase the payload size and weight. Desirably short flight times may also be achieved. Furthermore, the UAV/glider is configured to have maneuverability, loiter-ability, and enhanced targeting-ability.

Figure 5:
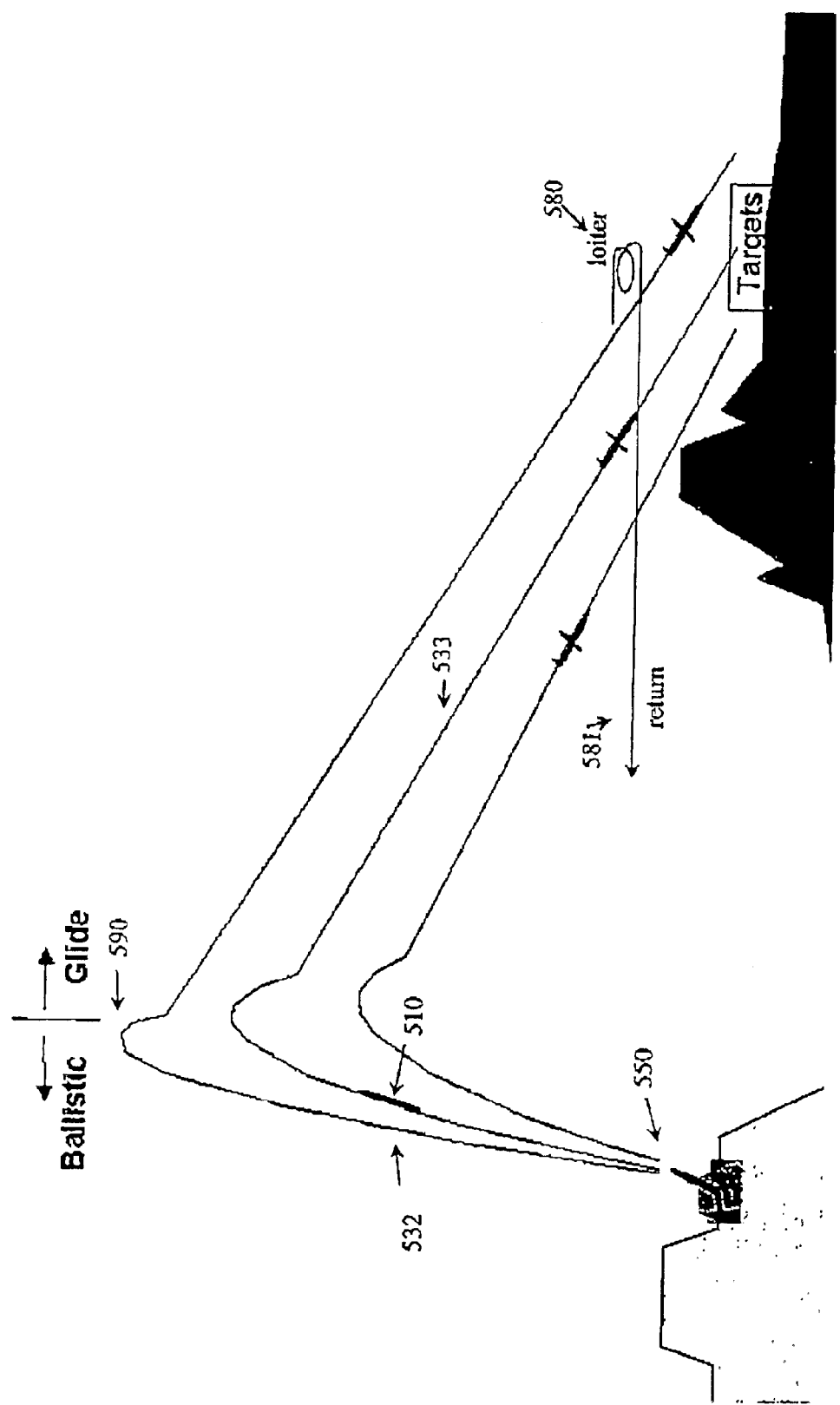
FIG. 5 illustrates various flying modes and phases of flight for an exemplary variable sweep wing UAV in accordance with an exemplary embodiment of the present invention.

With momentary reference to FIG. 5, various target acquiring techniques may be employed in accordance with exemplary embodiments of the present invention. For example, UAV 10 may be configured to perform terminal maneuvering such as by diving and turning 610, or by over-flying the target and approaching from behind 620. Furthermore, UAV 10 may also be configured to be able to retract variable sweep wing 30 and to perform approximately a vertical drop 630 on to a target.

Figure 6:
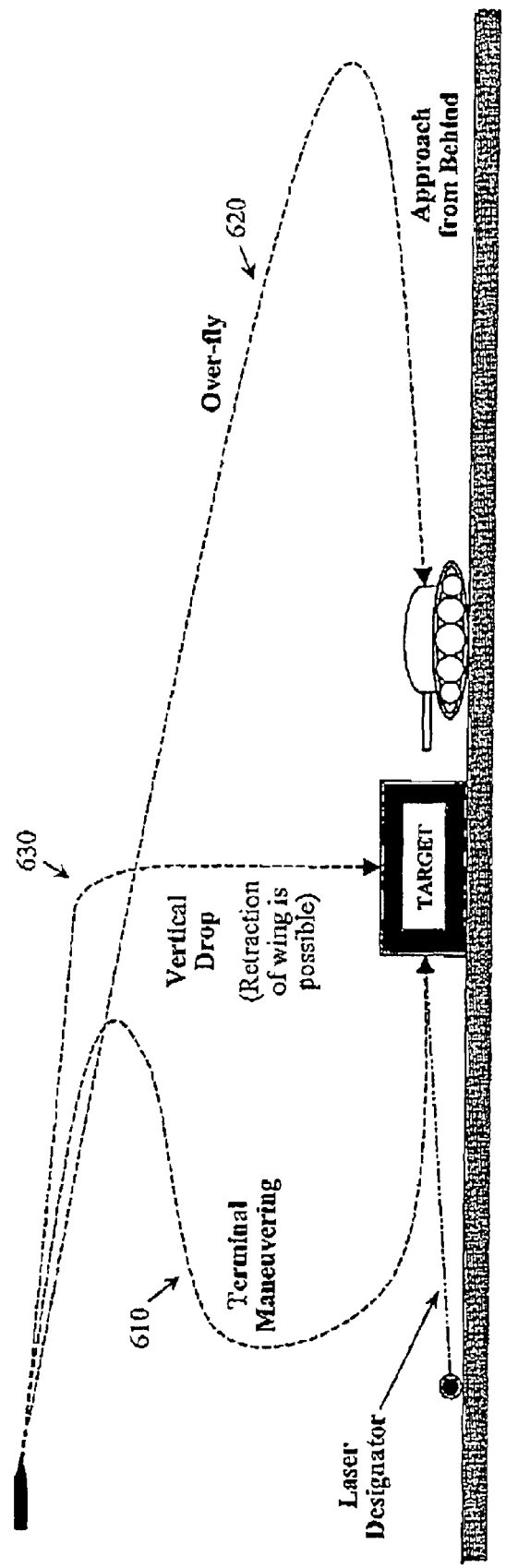
FIG. 6 illustrates various terminal target modes of an exemplary variable sweep wing UAV in accordance with an exemplary embodiment of the present invention.

FIG. 6 illustrates an exemplary method 700 of delivering a UAV over a distance. A UAV 210 may be delivered over a distance by first positioning wing 230 of UAV 210 such that the longest dimension of wing 230 is substantially aligned with the axial dimension of UAV body 20. In other words, body conformal wing 230 is positioned in a "closed" or un-deployed position. (Step 710) An un-deployed body conformal wing 230 may be positioned such that the outer surface of wing 230 is substantially flush with the outer surface of body 20. Wing 230 thus completes the outer surface of the UAV and generally gives the UAV a smooth, rounded outer mold line suitable for firing from a gun or launching with a propulsion device. Furthermore, tail fins, canards, and the like may also be retracted or folded in preparation for firing or launching of UAV 210.

Next, the flight of UAV 210 is initiated (Step 720) The flight may be initiated by rapidly accelerating UAV 210. The acceleration of UAV 210 may be accomplished in various ways. For example, UAV 210 may be placed inside a gun that is configured to supply an impulse that fires UAV 210 out of the gun. In another exemplary embodiment, UAV 210 is accelerated using an electromagnetic rail gun. In one embodiment, UAV 210 is accelerated to approximately Mach 2.4, although other speeds may be used. In another example, an on-board rocket launches UAV 210. In yet another embodiment, the flight of UAV 210 is initiated by dropping UAV 210 from an airborne aircraft.

Regardless of the method of initiating the flight, wing 230 remains in an un-deployed position during a first portion of the flight. For example, wing 230 is maintained in an un-deployed position during a ballistic portion of the delivery. (Step 730). The ballistic portion of the flight (see 32 and 532) is illustrated, for example, in FIGS. 1 and 4. During ballistic portion 532 of the delivery, it may be desirable to deploy the tail fins or other similar devices. For example, such tail fins may "pop out" or otherwise be positioned. The tail fins may assist in "de-spinning" UAV 210. The deployment of tail fins and/or canards may occur as appropriate and may be employed during any suitable phase of the delivery of UAV 210.

Next, wing 230 is deployed over a variable sweep angle, for example, between 0 degrees and 360 degrees, and preferably between 0 and 90 degrees. (Step 740) The variable sweep angle is adjusted to achieve high aerodynamic efficiency. For example, the variable sweep angle may be adjusted to account for the current speed, attack angle, and/or altitude of UAV 210. The sweep angle may be adjusted in accordance with various control schemes and parameters contemplated by the present invention. In one example, high L/D ratio gliding is achieved by adjusting the sweep angle according to aerodynamic sweep-angle scheduling. (Step 750). In a further example, on-board and/or off-board computers may look up the sweep angle in a relational database or the like. The look up may be based on one or more factors. The factors may include the current speed, attack angle, altitude, time from launch, and/or the like. Thus, the sweep angle may be calculated to be a function of the speed, attack angle, altitude of UAV 210 and/or the like.

These factors may be determined directly, such as through sensors, or may be determined indirectly. For example, sensors may determine the current speed, altitude, control in gust, ground wind speed and direction, homing information, targeting information, time, or other useful information and relay this information to a computer that, for example, regulates the wing deployment within a closed loop feedback configuration. The computer may determine the appropriate sweep angle for the wing based on this data. In another example, an on board Global Positioning Device may be used to determine the instantaneous three dimensional position of UAV 210, from this information, the speed and trajectory of UAV 210 may be determined. In another embodiment, factors such as altitude or speed may be determined based on the time from when UAV 210 was fired. Other sensor type devices include gyroscopes and laser guided targeting devices.

In one example, an onboard computer may perform the look up function in a table that is also stored in onboard memory. Various other methods of determining the sweep angle may involve the access of pre-determined sweep angles based on interpolation with current information. Similarly, preprogrammed sweep angles may be used to control the deployment of wing 230. Thus, wing 230 may be deployed over a predetermined schedule. The deployment sweep angles, in other embodiments, may be determined in real time. In other words, computations may be made and controls may be located on-board UAV 210 and/or external to UAV 210. The sweep angle may also be controlled from external sources, such as by using radio control signals. For example, UAV 210 may be flown by a remote pilot as a drone. The UAV may be controlled by a command center (located in the air, on land, or on a ship). In some instances, this control may include remote pilot, but in other instances, the control is automated. The sweep angle of wing 230 may also be adjusted through any other suitable method. Method 700 may further include the optional step of terminal homing using various wing/fin/canard controls as discussed herein. (Step 760).

FIG. 4 illustrates an exemplary gliding stage 533 in accordance with an exemplary embodiment of the present invention. Wing 230 may begin deployment at any time prior or after reaching the proximity of apogee 590. During gliding stage 533, a sweep adjustment may be driven by control mechanism 240. Furthermore, maneuvering of UAV 210 may allow UAV 210 to loiter 580 and/or return 581 to home base after performing reconnaissance. For example, UAV 210 may loiter for approximately an hour at 5000 feet, or other suitable times and altitudes. If UAV 210 is configured to return after conducting reconnaissance, it may also be configured to be re-usable for future missions.

Figure 7:
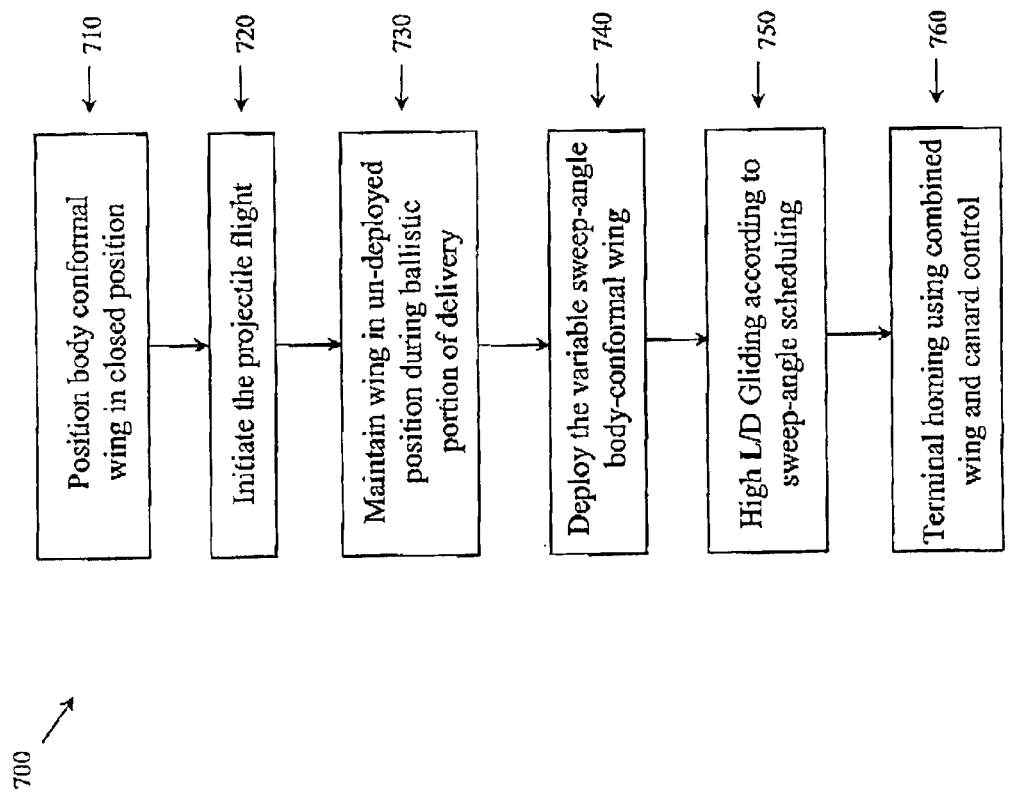
FIG. 7 illustrates various steps in an exemplary method for delivery of variable sweep wing UAV in accordance with an exemplary embodiment of the present invention.

During the gliding phase 533, UAV 510 exhibits high aerodynamic glide efficiency. This is possible at all flight regimes (supersonic, transonic, subsonic) because the sweep angle is adjusted to achieve high L/D ratios at each particular speed. It is noted that in the absence of a propulsion device, the importance of efficient gliding is increased. Thus, the ability to adjust the sweep angle for different flight conditions facilitates achieving high aerodynamic efficiency through out the flight. Thus UAV range may be extended FIG. 7 illustrates an exemplary fully deployed sweep wing 830 shown from a front view. UAV 810 is shown configured with four tail fins 880. Maneuvering of UAV 810 may be facilitated through use of tail fin control, canard control, wing control, and/or a combination of these control surfaces. Furthermore, a high aerodynamic efficiency and stability enhancement may be obtained by, for example, moving wing 230 fore/aft and/or rotationally about a Y axis—adjusting the center of gravity and/or aerodynamic center of gravity of UAV 210. If UAV 210 includes a propulsion device, high aerodynamic efficiency may further involve adjustments to the speed of UAV 210.

Any appropriate adjustments to the sweep angle or other positioning of the wing, as discussed above, may be determined by an on-board computer configured to look up and/or interpolate (on-line or offline) data to select an appropriate sweep angle, angle of attack, and/or the like, for high aerodynamic efficiency. The data may be located in a multidimensional array. The data may be determined by using, among other techniques, computational fluid dynamic calculations. In particular, the computational fluid dynamics calculations are determined for various oblique wing angles at various altitudes, speeds, and/or angles of attack.

In various embodiments, UAV 210, with a 110 pound weight and 12,000 G's, is deliverable over ranges greater than 63 nm, and over 100 nm (without the wing extension). Furthermore, this UAV may be deliverable over 200 nm with the wing extension. Moreover, UAV 210 can be delivered without a rocket 100 nm in less than about 10 minutes. This is possible because highly efficient flying is made possible by use of a variable sweep wing controlled to obtain L/D ratios tailored to the current speed and/or altitude of the UAV. Thus long range and short flying times may be achievable.

The present invention has been described above with reference to an exemplary embodiment. Although the present invention is set forth herein in the context of the appended drawing figures, it should be appreciated that the invention is not limited to the specific form shown. For example, although the invention is described above in connection with a gun fired projectile, variable sweep wing devices may also be used in UAVs dropped from an airborne flight vehicle. Furthermore, targets may be in the air, at sea, or on the ground. Various other modifications, variations, and enhancements in the design and arrangement of the methods and apparatus set forth herein, may be made without departing from the spirit and scope of the present invention. For example, the various components may be implemented in alternate ways, such as varying or alternating the steps in different orders. These alternatives can be suitably selected depending upon the particular application or in consideration of any number of factors associated with the operation of the system. As a further example, various embodiments may be combined such as using both variable sweep wing described herein with a rocket propulsion system. These and other changes or modifications are intended to be included within the scope of the present invention.

What is claimed is:

1. An unmanned air vehicle ("UAV") for delivery of a payload and for extended range operation comprising,
   a body,
   a body-conformal wing, wherein said body-conformal wing is configured to form the outer surface of said UAV body when it is an an un-deployed position, thereby having a seamless outer-mold-line conformal to the UAV body,
   the body conformal wing is of elliptical or quasi-elliptic platform shape and its airfoil designs are to satisfy the low drag and large lift to drag ratio requirement for optimal aerodynamic performance and to satisfy containment requirements under high-G conditions during a gun launch,
   further comprising in its un-deployed condition, an outer-mold-line completely compliant with that of an axisymmetric body or a body of revolution, allowing it to be gun launched, tube launched or aircraft launched,
   a control pivot mechanism to actuate the wing to perform variable wing sweep and wing-incidence according to a pre-set schedule in order to achieve optimal flight performance throughout the trajectory,
   control surfaces for stability and for flight control,
   said control surfaces comprise a set of fins, for pitch-yaw control, said wing for roll control, canards for pitch-yaw control, wherein said fins are necessary for de-spinning and stabilizing,
   ascending and descending trajectories throughout a plurality of flight phases, wherein the UAV is in a ballistic trajectory phrase when in its ascending phase and a gliding trajectory phase in its descending phase,
   wherein said fins and a boat-tail are deployed in the ballistic phase,
   wherein said fins, said wing, a wing extension and canards are deployed during the gliding phase.

2. The unmanned air vehicle as claimed in claim 1, wherein said control mechanism is configured to adjust the wing-sweep angle and the angle-of-attack (incidence) of said body-conformal wing in order for the UAV to achieve optimal aerodynamic performance and maximum lift to drag ratio at all flight conditions throughout the trajectory.

3. The unmanned air vehicle as claimed in claim 2, further comprising a controller capable of a guided munitions, loitering and reconnaisance missions.

4. The unmanned air vehicle as claimed in claim 1, wherein said UAV is configured to be controlled by said wing for roll control and at least one of said fin(s) and canard(s) for pitch and yaw control.

5. The unmanned air vehicle as claimed in claim 1, wherein the control mechanism is configured to variably adjust the wing sweep in conjunction of the wing incidence of the body-conformal wing according to a general sweep and angle of attack schedule, which has been obtained either by computational means or through wind-tunnel measured data, stored in a computer memory, to achieve optimal lift to drag ratios throughout the flight.

6. The unmanned air vehicle as claimed in claim 1, wherein said UAV further comprises a propulsion device in order to enhance the extended range of the UAV, said propulsion device is one of a rocket-motor, turbo-propulsion or propeller propulsion.

7. The unmanned air vehicle as claimed in claim 1, wherein said UAV is capable of being gun-launched or tube-launched from underwater or from in air or from one of a aircraft or rotorcraft from the air.

8. The unmanned air vehicle as claimed in claim 7, wherein said UAV by gun launch has a robust structure and component design, capable of sustaining gravitational accelerations between the range of 7,000-G to 16,000-G.

9. The unmanned air vehicle as claimed in claim 8, wherein said UAV body diameter is between 5 and 16 inches.

10. The unmanned air vehicle as claimed in claim 1, wherein the controlled pivot mechanism will first raise the wing to a higher elevation above the outer mode-line of the body, then actuate to perform the wing-sweep and wing-incidence adjustments according to the sweep-incidence scheduling.

11. The unmanned air vehicle as claimed in claim 10, wherein said controlled pivot mechanism at the attachment point is actuated to be movable in the fore/aft direction in order to trim and maintain stability of the UAV under various flight conditions.

12. The unmanned air vehicle as claimed in claim 1 wherein said UAV further comprises tail fins and wherein said tail fins are deployable and embedded within the body in an un-deployed configuration, wherein they are deployed immediately after launch and wherein said fins are body conformal.

13. The unmanned air vehicle as claimed in claim 1 wherein said body-conformal wing further comprise a telescopically extendable wing portion, said portion increases the wing span thereby reducing the induced drag, enhancing the lift to drag ratio and extending the UAV's range.

14. The unmanned air vehicle as claimed in claim 1 wherein the UAV is capable of being used as a reusable launch munition, as well as during loitering and reconnaissance missions, further comprising a propeller during subsonic flight, wherein the second wing planform is identical to the first wing.

15. The unmanned air vehicle as claimed in claim 14, further comprising a second body-conformal wing wherein said first and second body conformal wings are attached to opposite sides of the UAV, and are to be deployed in a biplane configuration for low subsonic cruising, wherein the second wing is to have a different airfoil section from the single wing on top.

16. A method for delivering the UAV of claim 15 comprising
deploying said fins, to de-spin the UAV body and achieve UAV stability,
blowing-out said boat-tail in order to reduce base drag,
swinging out the wing after UAV reaches an apogee,
optionally deploying canards,
gliding said UAV after the UAV reaches its apogee to a pre-set wing seep-wing incidence schedule,
optionally extending the first wing for an extended range operation
wherein said second wing enhances the aerodynamic performance in the cruise phase, and has two release plans,
the first of said release plan releases the second wing after a point of loitering, wherein the second wing swings out while the single wing is already in a fully extended position,
the second of said release plan releases the second wing during the subsonic descending phase, wherein both wings swing out symmetrically to form an X-configuration, which rapidly transitions to a final biplane configuration.

17. The unmanned air vehicle as claimed in claim 1, wherein said second wing enhances the aerodynamic performance in the cruise phase, and has two release plans,
the first of said release plan releases the second wing after a point of loitering, wherein the second wing swings out while the single wing is already in a fully extended position,
the second of said release plan releases the second wing during the subsonic descending phase, wherein both wings swing out symmetrically to form an X-configuration, which rapidly transitions to a final biplane configuration.

18. A method for delivering the UAV of claim 1 comprises,
deploying said fins, to de-spin the UAV body and achieve UAV stability,
blowing-out said boat-tail in order to reduce base drag,
swinging out the wing after UAV reaches an apogee,
optionally deploying canards,
gliding said UAV after the UAV reaches its apogee to a pre-set wing seep-wing incidence schedule,
optionally extending the wing for an extended range operation.

19. The method of claim 18 further comprising the step using at least one control surface for terminal homing.

20. The method of claim 18, wherein the UAV's flight is initiated by firing said UAV from a gun.

21. The method of claim 18, further comprising initiating UAV flight by launching said UAV as a rocket.

22. The method of claim 18 further comprising the step of extending the body-conformal wing with a telescope extension.

23. The method of claim 18 further comprising the step of remote piloting the UAV.

24. The method of claim 18 wherein the UAV is controlled as a Guided Munitions Projectile.

25. The method of claim 18, wherein the UAV flight is initiated by an underwater tube launch.

26. The unmanned air vehicle as claimed in claim 1 or in claim 7, wherein a second wing enhances the aerodynamic performance in the single-wing supersonic cruise phase, and has two release plans,
the first of said release plan release the second wing after a point of single-wing cruising, wherein the second wing swings out while the single wing is already in its oblique design position for supersonic cruise,
the second of said release plan releases the second wing during the supersonic cruising phase, wherein both the wings swing out symmetrically to form an X-configuration, whose swing-out angle is confined within the Mach cone in order to achieve minimum save drag and sonic-boom signature.

27. An unmanned air vehicle (UAV) delivery system comprising
a body,
a body conformal wing, wherein said body conformal wing is configured to variably sweep from a closed position to a deployed position, wherein said body-conformal wing has a span which is aligned with the longitudinal axis of said body in said closed position,
wherein the body-conformal wing is configured to pivot about an attachment point on said body and a pivot point on said body-conformal wing,
wherein said attachment point is configured to be moveable in the for and aft directions,
a control mechanism configured to variable adjust the sweep of said body conformal wing,
an UAV acceleration device.

28. The unmanned air vehicle as claimed in claim 27, wherein the UAV delivery system further comprises a control system for remote communications.

29. The unmanned air vehicle as claimed in claim 27, wherein the control systems comprise one of a PZT (piezoelectric controls), MEMS (micro electric mechanical control), synthetic jets, or winglets (Flaperon) for roll control.

* * * * *